(12) United States Patent
Spears

(10) Patent No.: US 7,495,806 B2
(45) Date of Patent: Feb. 24, 2009

(54) SYSTEM AND METHOD FOR COMPENSATING FOR NOISE IN A CAPTURED IMAGE

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1463 days.

(21) Appl. No.: 10/395,999

(22) Filed: Mar. 24, 2003

(65) Prior Publication Data

US 2004/0189835 A1   Sep. 30, 2004

(51) Int. Cl.
*G06K 15/00*   (2006.01)

(52) U.S. Cl. .................. 358/3.26; 358/1.9; 358/514; 358/483; 358/448; 358/463

(58) Field of Classification Search .................. 358/1.9, 358/3.12, 3.26, 474, 482, 483, 505, 513, 358/514, 528–530, 533, 534, 538, 448, 463; 382/176, 254, 260; 348/222.1, 241
See application file for complete search history.

(56) References Cited

U.S. PATENT DOCUMENTS 6,646,246 B1 * 11/2003 Gindele et al. .............. 348/241

2002/0054399 A1 * 5/2002 Okamura ..................... 358/529
2005/0140795 A1 * 6/2005 Hisamatsu et al. ......... 348/222.1
2006/0050980 A1 * 3/2006 Kohashi ...................... 382/254
2008/0025630 A1 * 1/2008 Hofman et al. ............. 382/260

FOREIGN PATENT DOCUMENTS

| JP | 61139158 A | 6/1986 |
| JP | 2001275036 A * | 10/2001 |
| JP | 2001326819 A | 11/2001 |

* cited by examiner

*Primary Examiner*—Kimberly A Williams

(57) ABSTRACT

A system and method are provided that compensates for noise in a captured image. One embodiment comprises scanning an image a predefined number of times with a plurality of pixels, receiving light information from each of the plurality of pixels each time the image is scanned, converting the received light information into a plurality of data values, each of the data values corresponding uniquely to light information from one of the plurality of pixels, generating a plurality of pre-divided data values by dividing each of the data values by a number corresponding to the number of times that the image is scanned, and adding corresponding ones of the pre-divided data values together such that an average data value is determined uniquely for each of the plurality of pixels so that noise is compensated by the averaging of the data values.

38 Claims, 7 Drawing Sheets

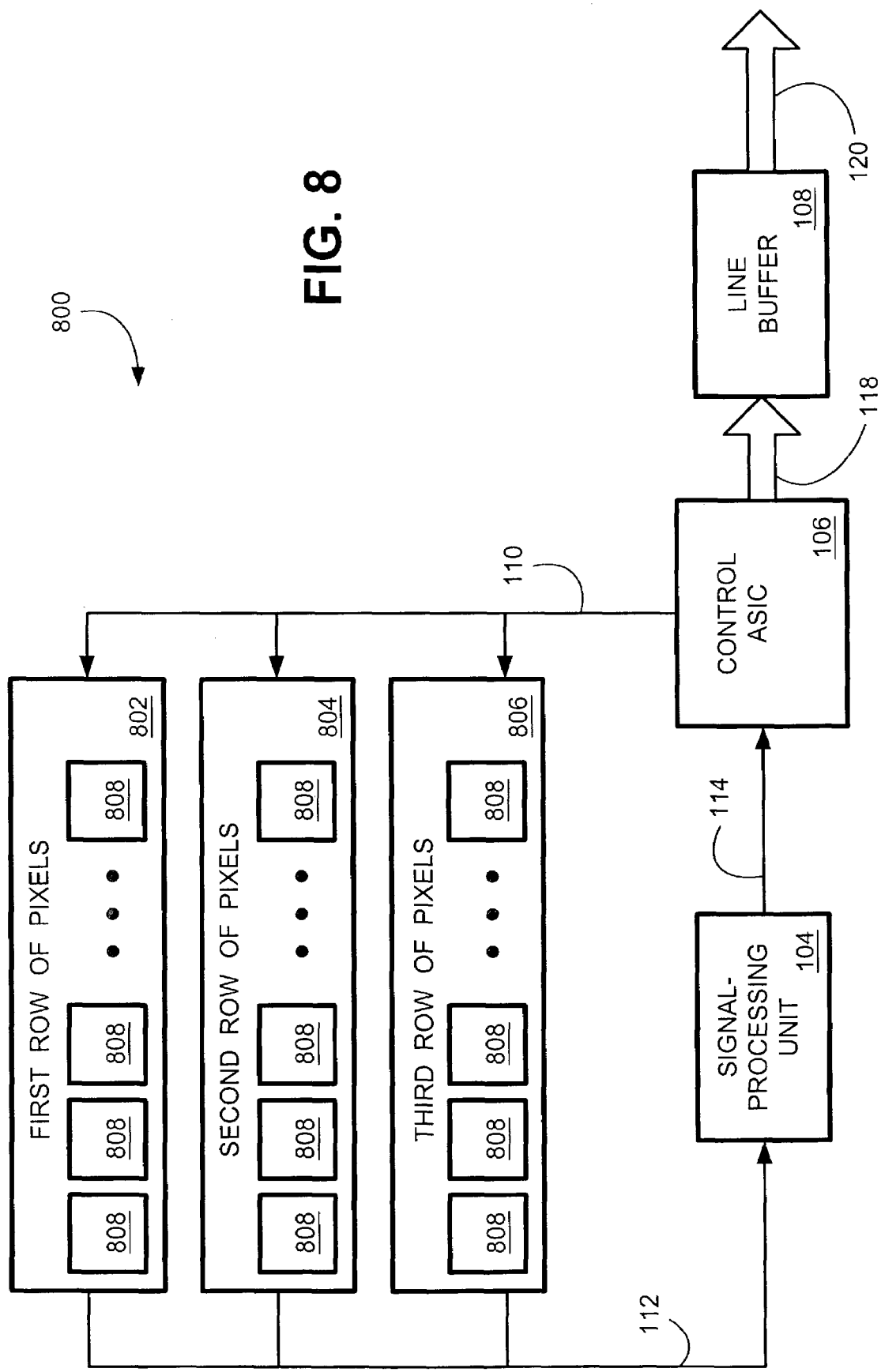

SYSTEM AND METHOD FOR COMPENSATING FOR NOISE IN A CAPTURED IMAGE

BACKGROUND OF THE INVENTION

1. Field of the Invention

The present invention generally relates to digital-based imaging devices and, in particular, to a system and method for compensating noise in a captured image.

2. Related Art

With the advent of digitally-based imaging devices capable of scanning and capturing an image, complex systems and methods have been developed to improve the quality of the captured image. One exemplary digitally-based imaging device is a scanner. One embodiment of a black-and-white scanner employs at least one linear array of pixels, such as a charged-coupled device (CCD). A color scanner employs color-sensitive pixels residing in a plurality of CCDs. Color-sensitive pixels in these CCDs may be, for example, sensitive to green, red and blue light. Matrix CCDs, also referred to as area CCDs, are similarly configured into a matrix of pixel rows and pixel columns.

One type of CCD has at least an array of pixels aligned in a linear configuration. Registers are in communication with each pixel to collect light information from each pixel. The CCD also comprises components configured to communicate the collected light information from the pixels into the registers, and to communicate the light information from the registers to a processor, such as a control application specific integrated circuit (ASIC).

Each pixel accumulates a charge as light is detected. The magnitude of the collected charge is proportional to the amount of light sensed by the pixel. This charge is referred to hereinafter as light information Furthermore, a scanner is likely to have a plurality of CCDs or a matrix CCD having color-sensitive pixels, particularly if color scanning is provided.

Random noise in the CCD causes variation in the measured output from the pixels such that the collected light information does not precisely correspond to the detected image. If a pixel is exposed to an identical amount of light during successive readings, the measured output will randomly vary around the correct output. In addition, shot noise occurs in light detection. Shot noise is the noise due to the statistical probability that any single photon is converted to an electron. For example, a pixel may be accumulating charge proportional to incident light reflected from an image. Light information corresponding to the value of the accumulated change from each of the pixels is received and converted into a digital data value.

Accordingly, when a pixel accumulates charge from incident light reflected from an image a first time, a first data value is determined from the received light information. Thus, for a plurality of pixels, there is a plurality of corresponding first data values, one data value for each pixel. When the plurality of pixels are again exposed to the same image under identical conditions the pixels accumulate charge from incident light reflected from the same image a second time, light information from the pixels are received and converted into a second plurality of data values.

In the absence of random and/or shot noise, the first and second data values for any one pixel would be equal, and the data values would correspond to the true color of the detected image. However, because of random and/or shot noise, rarely will the first and second data values for any one pixel be equal to each other and/or equal to the data value corresponding to the true color of the detected image.

Random noise and/or shot noise, if not reduced, cause undesirable visible variations in the appearance of the processed image. For example, a region of an original image having a uniform color can appear to have color variations in the corresponding region of the reproduced image.

CCD devices may be configured to compensate, calibrate and/or reduce non-uniformities due to random and/or shot noise. Signal averaging of light information can be used to determine data values that more closely correspond to the detected image of the light information, thereby improving image quality.

Signal averaging is effected by defining a number of times, referred to hereinafter as the number of samples, that the CCD will capture the image or the portion of the image. For each pixel, the data values corresponding to the light information are added together and then divided by the sample size. Signal averaging is an effective way to compensate for random and/or shot noise because the process of capturing an image (or portion of an image), and the subsequent generation of the data values, can occur very rapidly.

For example, the sample size may be defined as four. In a device configured to scan a portion of an image, the device scans the image portion four times. That is, the portion of the image that is scanned is exposed to light, and the light information from the CCD is received four times. The data values associated with the light information from the four scans are added for each one of the pixels, and then divided by four (the sample size), thereby determining an average value of data for each pixel.

However, the above-described signal-averaging process requires a significant amount of memory and bandwidth to process the data. If sufficient memory and/or bandwidth is not available, data overflows and associated errors may occur when the data values for the selected samples are added.

For example, a CCD device may be configured to communicate and process data values using a sixteen-bit system. The capacity of the digital data system, here sixteen-bits, is hereinafter referred to as bandwidth. Accordingly, a sixteen-bit system is designed to communicate, store and process data values residing in no more than sixteen-bits. If a data value is encountered or generated that is too large to be represented by the sixteen-bit limit, an overflow condition results. That is, the system must somehow recognize and accommodate the data value that is too large to be represented by a single sixteen-bit number.

Overflow conditions may occur when the data values are added during the signal-averaging process. The overflow condition must be accommodated to avoid numerical errors. One approach is to increase the system bandwidth to operate using a greater number of bits, such as thirty-two bits. Accordingly, the components of the system, such as the processor, the memory and the communication busses, are designed with sufficient bandwidth to accommodate thirty-two bit digital data. Thus, when sixteen-bit data values corresponding to the light information is added together when signal averaging is performed, data values that are greater that sixteen-bits can be accommodated (represented with a thirty-two bit number). However, designing and fabricating a thirty-two bit system to communicate and process data that can be mostly represented with sixteen-bits is not a very efficient and/or cost-effective approach to accommodating overflows because a majority of the data values can be represented with sixteen-bits.

Another approach to accommodating overflows is to employ specialized software that recognizes and accommodates overflow conditions. For example, a sixteen-bit system may be configured to a recognize a data value that is too large to be represented with sixteen-bits. The software then employs two sixteen-bit data values to represent the larger data value. However, such specialized systems require additional processing time or processing capacity to accommodate detected overflow conditions.

SUMMARY

Generally, one embodiment of the present invention compensates for noise in a captured image. One embodiment of the present invention comprises scanning an image a pre-defined number of times with a plurality of pixels, receiving light information from each of the plurality of pixels each time the image is scanned, converting the received light information into a plurality of data values, each of the data values corresponding uniquely to light information from one of the plurality of pixels, generating a plurality of pre-divided data values by dividing each of the data values by a number corresponding to the number of times that the image is scanned, and adding corresponding ones of the pre-divided data values together such that an average data value is determined uniquely for each of the plurality of pixels so that noise is compensated by the averaging of the data values.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention.

FIG. 8 is a block diagram illustrating another embodiment of an image capture device according to the present invention employing a plurality of rows of pixels having color-sensitive pixels.

DETAILED DESCRIPTION

In general, the present invention compensates for noise in a captured image. Hereinafter, the term image capture device refers to any device employing a plurality of pixels to capture an image, such as, but not limited to, a scanner, a digital camera, a facsimile machine (FAX), a copy machine, a printer or the like.

Figure 1:
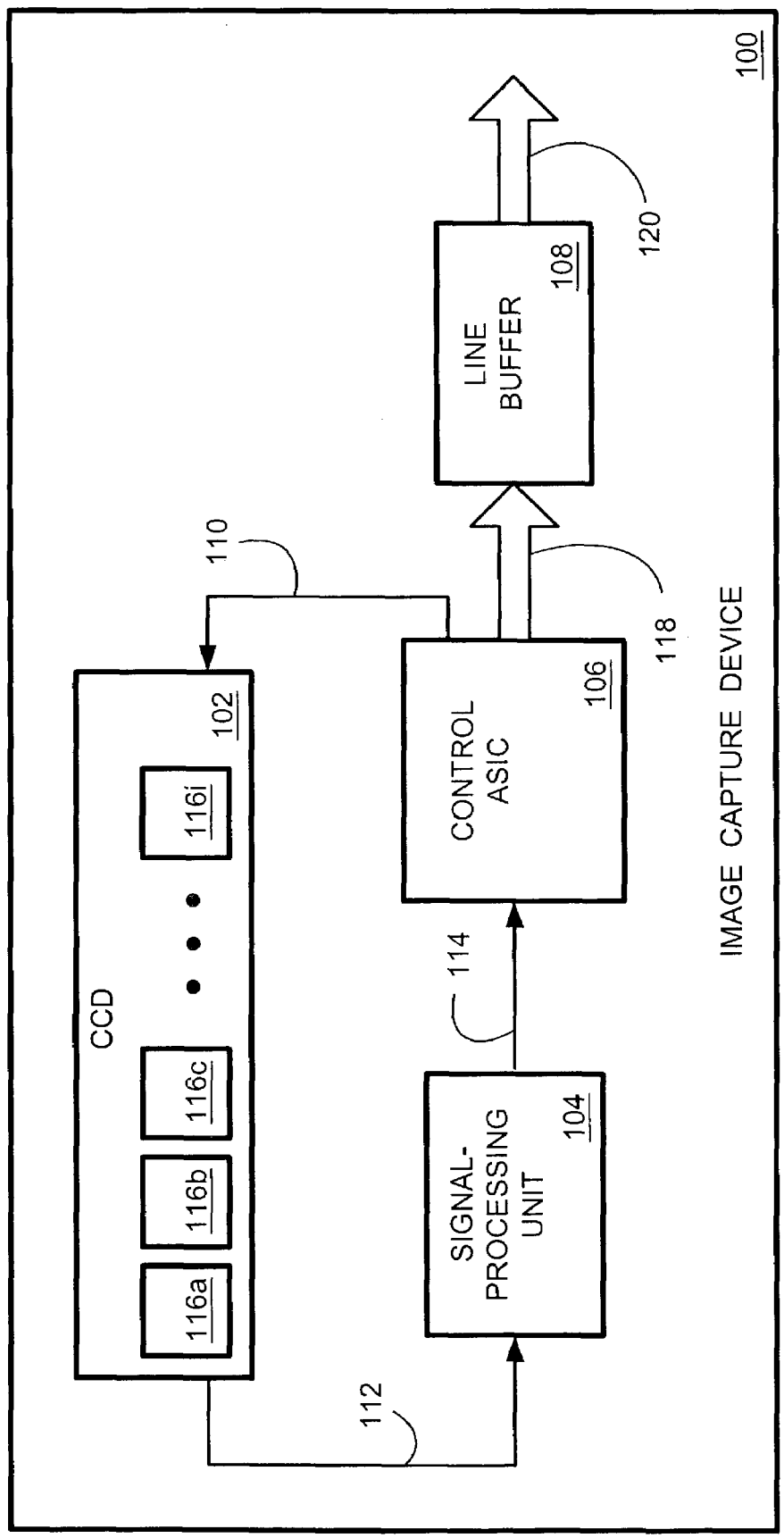
FIG. 1 is a block diagram illustrating an embodiment of an image capture device having a charge-coupled device (CCD) according to the present invention.

FIG. 1 is a block diagram illustrating an embodiment of an image capture device 100 having a charge-coupled device (CCD) according to the present invention. Image capture device comprises a CCD 102, a signal-processing unit 104, a control application specific integrated circuit (ASIC) 106 and a line buffer 108. Any suitably-configured processor (not shown) may be substituted for the control ASIC 106 in other embodiments.

The control ASIC 106 provides suitable control signals, via connection 110, to the CCD 102 such that light information is communicated through the signal-processing unit 104 to the control ASIC 106. Signal-processing unit 104 is comprised of one or more components configured to receive light information from CCD 102, via connection 112. The received light information corresponds to charges accumulated by the pixels residing in the CCD 102. The received light information is processed at least into a digital data format that is readable by control ASIC 106. Other processing may be performed by the signal-processing unit 104, such as, but not limited to, compensation of other known forms of noise. The digital data, described in greater detail below, is communicated to control ASIC 106, via connection 114.

For convenience, CCD 102 is illustrated as a component block. One embodiment of CCD 102 has at least an array of pixels 116a-116i aligned in a linear configuration. In one embodiment, according to the present invention, CCD 102 comprises approximately 10,000 pixels. Other embodiments employ different suitable numbers of pixels, and or types of color-sensitive pixels, in the CCD 102. Registers (not shown) are in communication with each pixel 116a-116i to collect charges, referred to as light information, from each pixel 116a-116i. The CCD 102 also comprises components configured to communicate the collected light information from the pixels 116a-116i into the registers, and to communicate the light information from the registers to the connection 112.

Random and/or shot noise compensation according to the present invention begins by exposing the image to a light source such that the pixels 116a-116i accumulate charge proportional to incident light reflected from the image. That is, a portion of the image is scanned by the CCD 102. After exposing the image to a light source, control ASIC 106 communicates a suitable instruction to the CCD 102 to cause light information to be communicated from the pixels 116a-116b. As light information from the first pixel 116a is communicated to the signal-processing unit 104, the light information is at least processed into a data value having a digital data format that is readable by control ASIC 106. (Additional processing of the light information may occur in the signal-processing unit 104 in conjunction with the processing of light information in accordance with the present invention.) The digital data corresponding to the light information from pixel 116a, referred to as a first data value for pixel 116a herein for convenience, is then communicated to the control ASIC 106.

Control ASIC 106 receives the first data value corresponding to the light information from pixel 116a, and in accordance with one embodiment of the present invention and as described in greater detail below, pre-divides the first data value for pixel 116a by a factor of four. This pre-divided first data value is then communicated from the control ASIC 106 to the line buffer 108, via connection 118. Line buffer 108 stores this pre-divided first data value for first pixel 116a.

The above-described embodiment pre-divides the first data value by a factor of four because the image portion is to be scanned four times by the CCD 102. In other embodiments, the image portion is scanned a number of predetermined times. Accordingly, a data value is pre-divided by a factor corresponding to the number of predetermined times that the image portion is scanned. For example, an image portion may be scanned eight times such that data values are pre-divided by eight.

Then, the CCD 102 is exposed to the image portion a second time in accordance with certain features of the present invention. After exposing the image to a light source the second time, control ASIC 106 communicates a suitable instruction to the CCD 102 to cause light information to be communicated from the pixels 116a-116i. As light information from the first pixel 116a is communicated to the signal-processing unit 104, the light information is at least processed into a data value having a digital data format that is readable by control ASIC 106. The digital data corresponding to the light information from pixel 116a is referred to as a second data value for pixel 116a herein for convenience. The second data value for pixel 116a is then communicated to the control ASIC 106.

Control ASIC 106 receives the second data value for pixel 116a, and in accordance with this embodiment of the present invention, pre-divides this second data value by a factor of four. This pre-divided second data value is then communicated from the control ASIC 106 to the line buffer 108. Line buffer 108 then adds the received second pre-divided data value for pixel 116a to the first pre-divided data value for pixel 116a, and stores the total for the first pixel 116a. That is, two pre-divided data values corresponding to light information from pixel 116a has been accumulated in line buffer 108.

One embodiment of the present invention employs a line buffer 108 having a plurality of accumulating registers. Thus, control ASIC 106 merely communicates the first and second pre-divided data values for pixel 116a to line buffer 108 such that the accumulation registers accumulate the pre-divided data values.

In another embodiment, line buffer 108 is a memory residing in a suitable location in the image capture device 100. Control ASIC 106 retrieves the first pre-divided data value for pixel 116a from the line buffer 108, adds the second pre-divided data value for pixel 116a, and then stores the accumulated total back into the line buffer 108.

Next, the CCD 102 is exposed to the image portion a third time. Similar to the above-described process, a third data value for pixel 116a is communicated to the control ASIC 106. Control ASIC 106 receives the third data value for pixel 116a, and in accordance with the present invention, pre-divides this third data value by a factor of four. This pre-divided third data value for pixel 116a is then communicated from the control ASIC 106 to the line buffer 108. Line buffer 108 then adds this third pre-divided data value to the accumulated data (the sum of the pre-divided first data value and the pre-divided second data value for pixel 116a), and stores the total for the first pixel 116a. That is, three pre-divided data values corresponding to light information from pixel 116a have been accumulated in line buffer 108.

The CCD 102 in this embodiment is exposed to the image portion for a fourth time. Similar to the above-described process, a fourth data value for pixel 116a is communicated to the control ASIC 106. Control ASIC 106 receives this fourth data value, and in accordance with the present invention, pre-divides this fourth data value by a factor of four. This pre-divided fourth data value is then communicated from the control ASIC 106 to the line buffer 108. Line buffer 108 then adds the fourth pre-divided data value for pixel 116a to the accumulated data (the sum of the first, second and third pre-divided data values), and stores the total for the first pixel 116a. That is, four pre-divided data values corresponding to light information from pixel 116a have been accumulated in line buffer 108.

Similarly, light information from the pixels 116b-116i is processed as described above as CCD 102 is exposed four times to the image portion. Accordingly, light information is received from each of the pixels 116b-116i and converted into a data value. The determined data values are pre-divided by four to generate pre-divided data values. Each pre-divided data value is communicated to and accumulated in line buffer 108.

In an alternative embodiment, each currently processed pre-divided data value is added to an accumulated pre-divided data value residing in a memory. Accordingly, control ASIC 106 retrieves the current accumulated pre-divided data value from the memory, adds the currently processed pre-divided data value, and then stores a new accumulated pre-divided data value back into the memory.

In accordance with the present invention and as described above, the CCD 102 has been exposed to an image and read four times. Accordingly, each pixel 116a-116i has been sampled four times. Thus, the above-described embodiment of the present invention is described herein as having a sample size of four.

Other embodiments may employ other suitable sample sizes. For example, when data values are based upon a binary system, a sample size of two may be defined in accordance with the present invention. That is, the CCD 102 is exposed to an image two times. Thus, data values are pre-divided by two, and then stored (and accumulated) into the line buffer 108.

Another embodiment may employ a sample size of eight, such that the CCD 102 is exposed to an image and read eight times. Accordingly, data values are pre-divided by eight, and then stored (and accumulated) into the line buffer 108. Other embodiments of the present invention employ other suitable sample sizes. As described below, the suitable sample size is preferably determined by the number of bit positions that correspond to random and/or shot noise. According to the present invention, low order bits associated with random and/or shot noise are truncated from the digital value (as determined by the number of bit positions by which the digital value is shifted).

Figure 2:
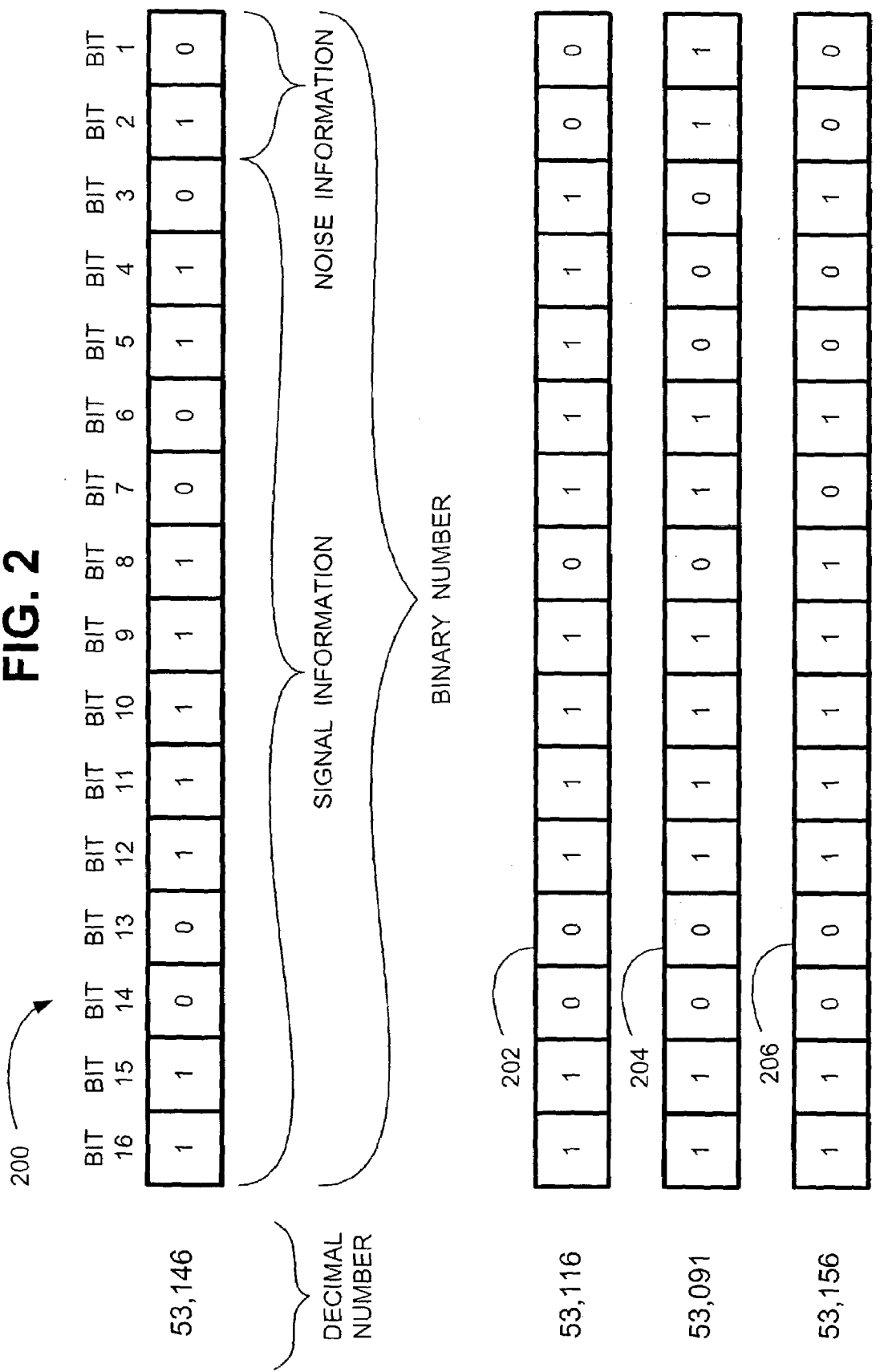
FIG. 2 is a block diagram illustrating four exemplary data values corresponding to light information from a pixel in the image capture device of FIG. 1.

FIG. 2 is a block diagram illustrating four exemplary data values corresponding to light information from a pixel in the image capture device of FIG. 1. As described above, light information from a pixel is converted into a data value. The data value, in one embodiment, is represented as a sixteen-bit binary number. In an embodiment employing a predefined sample size of four, the CCD 102 is exposed to an image and read four times. Accordingly, for each pixel, four data values are determined (one data value per pixel for each sample). For convenience of describing the present invention employing four samples, four hypothetical data values have been arbitrarily selected and represented as both decimal numbers and as sixteen-bit binary numbers.

Thus, for the first sample, a first data value 200, equal to 53,146 (decimal), is illustrated. Thus, the charge accumulated by one of the pixels in CCD 102 when exposed to the image the first time is converted to a sixteen-bit binary number 1100111110011010. The most significant bit, labeled as bit 16, contains a binary value of "1" and the least significant bit, labeled as bit 1, contains a value of "0" in accordance with this embodiment of the present invention.

Similarly, a second data value 202 is illustrated as having a decimal value of 53,116 and a binary value of 1100111101111100. A third data value 204 is illustrated as having a decimal value of 53,091 and a binary value of 1100111101100011. A fourth data value 206 is illustrated as having a decimal value of 53,156 and a binary value of 1100111110100100. These data values correspond to light information from the same pixel during the second, third and fourth samplings, respectively. Thus, for the illustrative example of four data values 200, 202, 204 and 206, the decimal values and binary values correspond to charges accumulated by a pixel when the CCD 102 is exposed to the same image (or image portion) four times.

In an ideal CCD having pixels that are not subject to noise, the four data values would be numerically equal and the value of the data values would precisely correspond to the detected image. However, noise causes the pixel to accumulate a slightly different charge during each sample. For instance, the first data value 200 and the second data value 202 differ by a decimal value of thirty (53,146−53,116=30). Furthermore, the true value for the data value is not known because the value of noise for any given sample point is not known.

However, the true data value is probably very close to all four data values 200, 202, 204 and 206. According to the present invention, averaging the four data values 200, 202, 204 and 206 will theoretically result in an average data value that more closely approximates the true data value. Thus, working in decimals, the average data value equals 53,127.25 (the sum of the four data values divided by four). That is, the average data value of 53,127.25 is expected to closely approximate the true data value.

As illustrated in FIG. 2, the two least significant bits (bit 1 and bit 2) do not materially affect the numerical results of the averaging process. In binary, the two least significant bits correspond to a decimal number that ranges from 0 to 3. At most, when the two least significant bits equal the decimal number 3, the percentage error introduced by incorrect values in the two least significant bits (bit 1 and bit 2) will at most equal an error of 0.006 percent. In other words, at worst, if the true data value for the two least significant bits (bit 1 and bit 2) is 00, and noise causes a reading of the two least significant bits (bit 1 and bit 2) of 11, the error between the read data value and the true data value will only be 0.006 percent. Such an error is not typically perceptible to a person viewing a captured image. Accordingly, in one embodiment, the two least significant bits (bit 1 and bit 2) are defined as noise bits and are not deemed material to the processing of data values during the signal-averaging process of the present invention.

Figure 3:
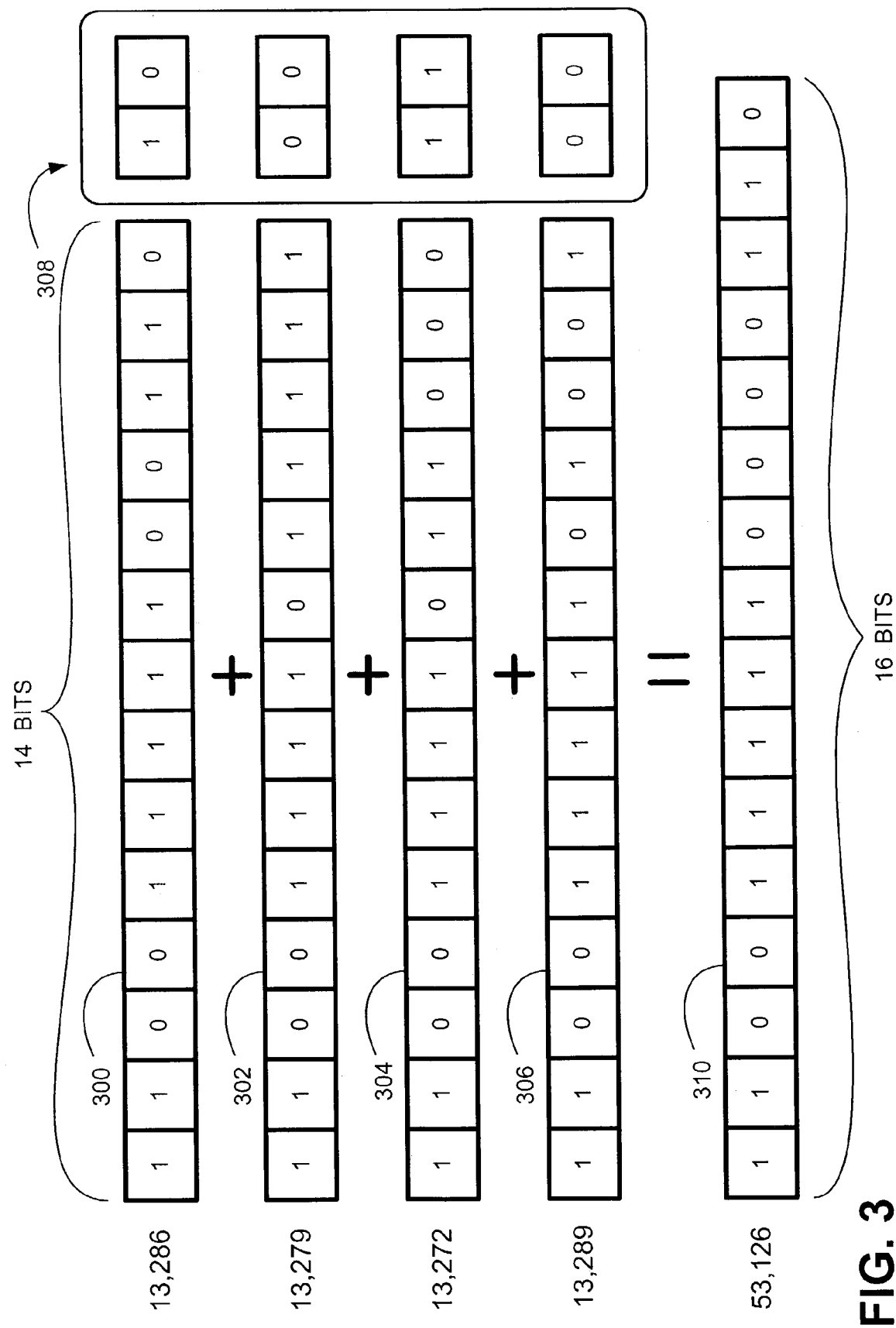
FIG. 3 is a block diagram illustrating the four sample data values of FIG. 2 pre-divided in accordance with the present invention, and the resultant averaged data value after the four pre-divided samples are accumulated in a buffer.

However, in the above-described embodiment that processes, stores and communicates data values using a sixteen-bit binary system, the four data values cannot be directly added together without the occurrence of an undesirable overflow condition. Accordingly, the four data values are pre-divided to generate four pre-divide data values. FIG. 3 is a block diagram illustrating the four sample data values of FIG. 2 pre-divided in accordance with the present invention, and the resultant averaged data value after the four pre-divided data values are accumulated in line buffer 108.

Data value 300 corresponds to a fourteen bit binary number 11001111100110, which is equivalent to a decimal value of 13,286. Data value 300 is the resultant data value after data value 200 (FIG. 2) is pre-divided by four. Thus, the decimal number 13,286 is approximately one fourth of the decimal value 53,146.

Similarly, data value 302 has a decimal value of 13,279 and a binary value of 11001111011111, and is equal to data value 202 pre-divided by four. Likewise, data value 304 has a decimal value of 13,272 and a binary value of 11001111011000, and is equal to data value 204 pre-divided by four. Data value 306 has a decimal value of 13,289 and a binary value of 11001111101001, and is equal to data value 206 pre-divided by four.

The binary value of data values 300, 302, 304 and 306 are determined in one embodiment by simply dropping the least two significant bits (bit 1 and bit 2) of their respective data values 200, 202, 208 and 206. These truncated bits are shown in region 308 for illustration purposes. In another embodiment, data values 200, 202, 208 and 206 reside in a serial register that is bit shifted by two positions such that data values 300, 302, 304 and 306 result.

When the data values 300, 302, 304 and 306 are added together, the average data value 310 is determined. In the illustrative example of FIG. 3, the average data value 310 equals the binary number 53,126 or the sixteen-bit binary number 1100111110000110. According to the present invention, the four data values 300, 302, 304 and 306 are added together without an overflow condition occurring.

In an embodiment employing a line buffer 108 having a plurality of sixteen-bit serial accumulating registers, the average data value for each pixel is determined without the possibility of an overflow condition. Accordingly, additional bandwidth in the processor, the memory and the communication busses (such as a seventeen-bit binary number) is not required. Alternatively, special logic is not required that detects and accommodates overflow conditions.

When a line buffer 108 having a plurality of sixteen-bit accumulating registers is employed, a plurality of first data values are each stored in one of the accumulating registers. One accumulating register corresponds to one pixel. As a plurality of second data values are determined from the second sampling of the image in accordance with an embodiment of the present invention, the second data value for each respective pixel is pre-divided and accumulated into the respective accumulation register. Similarly, as a plurality of third data values are determined from the third sampling of the image in accordance with the present invention, the third data value for each respective pixel is pre-divided and accumulated into the respective accumulation register. Finally, a plurality of fourth data values are determined from the fourth sampling of the image in accordance with the present invention, and the fourth data value for each respective pixel is pre-divided and accumulated into the respective accumulation register. Thus, according to the present invention, a plurality of average data values are determined after four samples are collected. The plurality of average data values, closely approximate the true data values, and accordingly, random and/or shot noise has been reduced for each data value.

Other embodiments of the present invention employ other suitable numbers of accumulating registers in line buffer 108. For example, one embodiment employs thirty-two bit accumulating registers in line buffer 108.

Once sampling has been completed, data is communicated from buffer 108, via connection 120, out to other components of the image capture device 100 for additional processing. Accordingly, the resultant captured image more closely corresponds to the original image since random and/or shot noise has been reduced for each pixel's corresponding data value.

Figure 4:
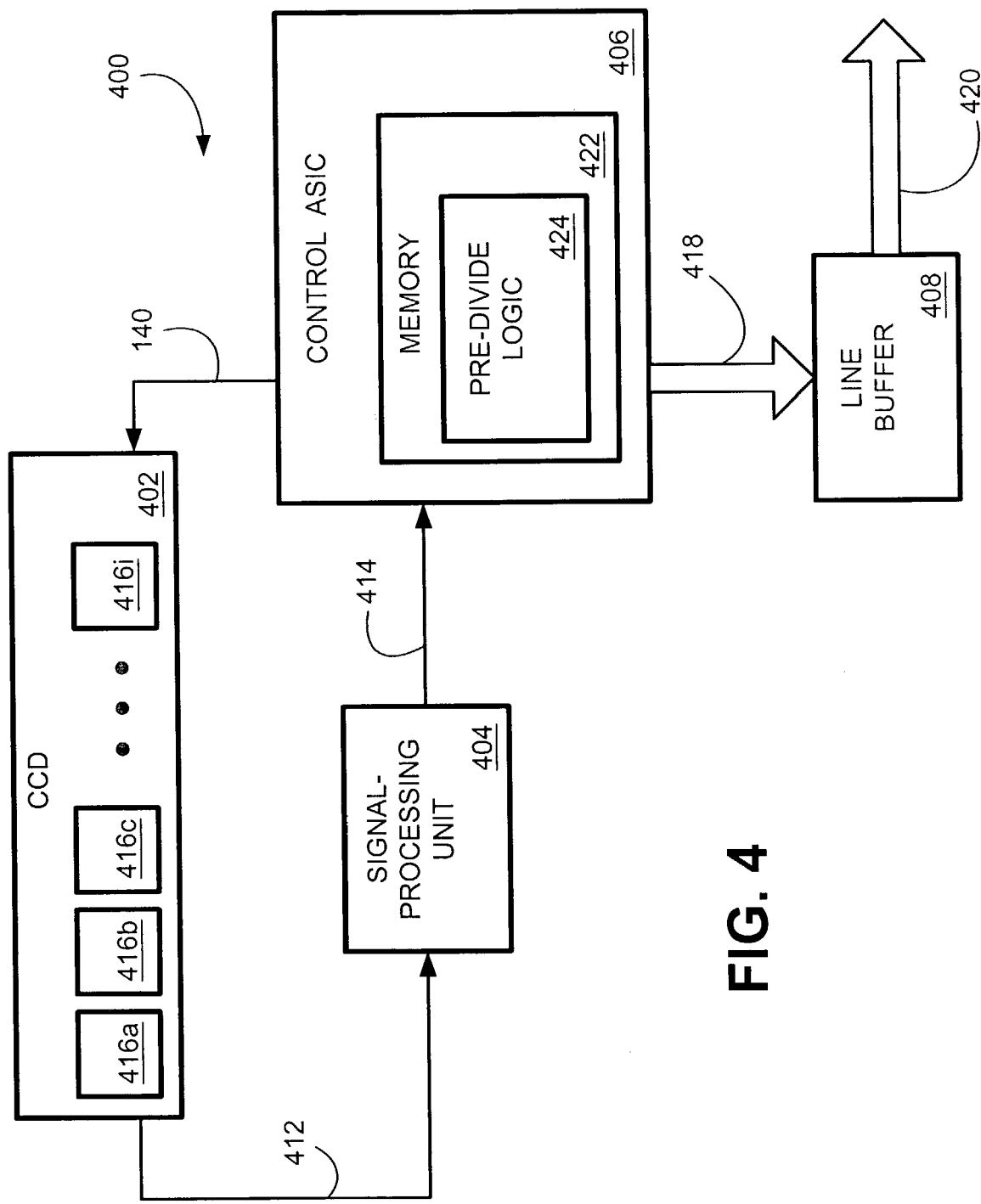
FIG. 4 is a block diagram illustrating another embodiment of an image capture device according to the present invention.

FIG. 4 is a block diagram illustrating another embodiment of an image capture device according to the present invention. Image capture device 400, similar to the image capture device 100 (FIG. 1), comprises at least a CCD 402, a signal-processing unit 404, a control ASIC 406 and a line buffer 408. Any suitably-configured processor (not shown), in another embodiment in accordance with the present invention, may be substituted for the control ASIC 406.

Line buffer 408 is implemented as a memory, or a portion of a suitable memory. The current data value for each pixel is retrieved from the line buffer 408, and the incoming corresponding pre-divided data value for each pixel is added to the current data value to determine a new current data value. These new current data values are stored back into the line buffer 408. The process repeats until all sampling has been completed in accordance with the present invention. Then, data is communicated from buffer 408, via connection 420, out to other components of the image capture device 400 for additional processing.

Accordingly, control ASIC 406 comprises at least a memory 422. Memory 422 comprises at least pre-divide logic 424. As incoming data values are received from signal-processing unit 404, control ASIC 406 (or another suitable processor) executes the pre-divide logic 424 to pre-divide incoming data values. According to the present invention, a plurality of pre-divided data values are determined for each of the four samples such that the current data value for each pixel is stored in line buffer 408, as described above. Accordingly, this embodiment is implemented in the line buffer 408, a memory, utilizing a plurality of sixteen-bit data values. Memory size is minimized since the capacity of line buffer 408 does not need to be allocated for the storage of binary numbers greater that sixteen-bits (as would be required if overflow conditions were encountered).

Figure 5:
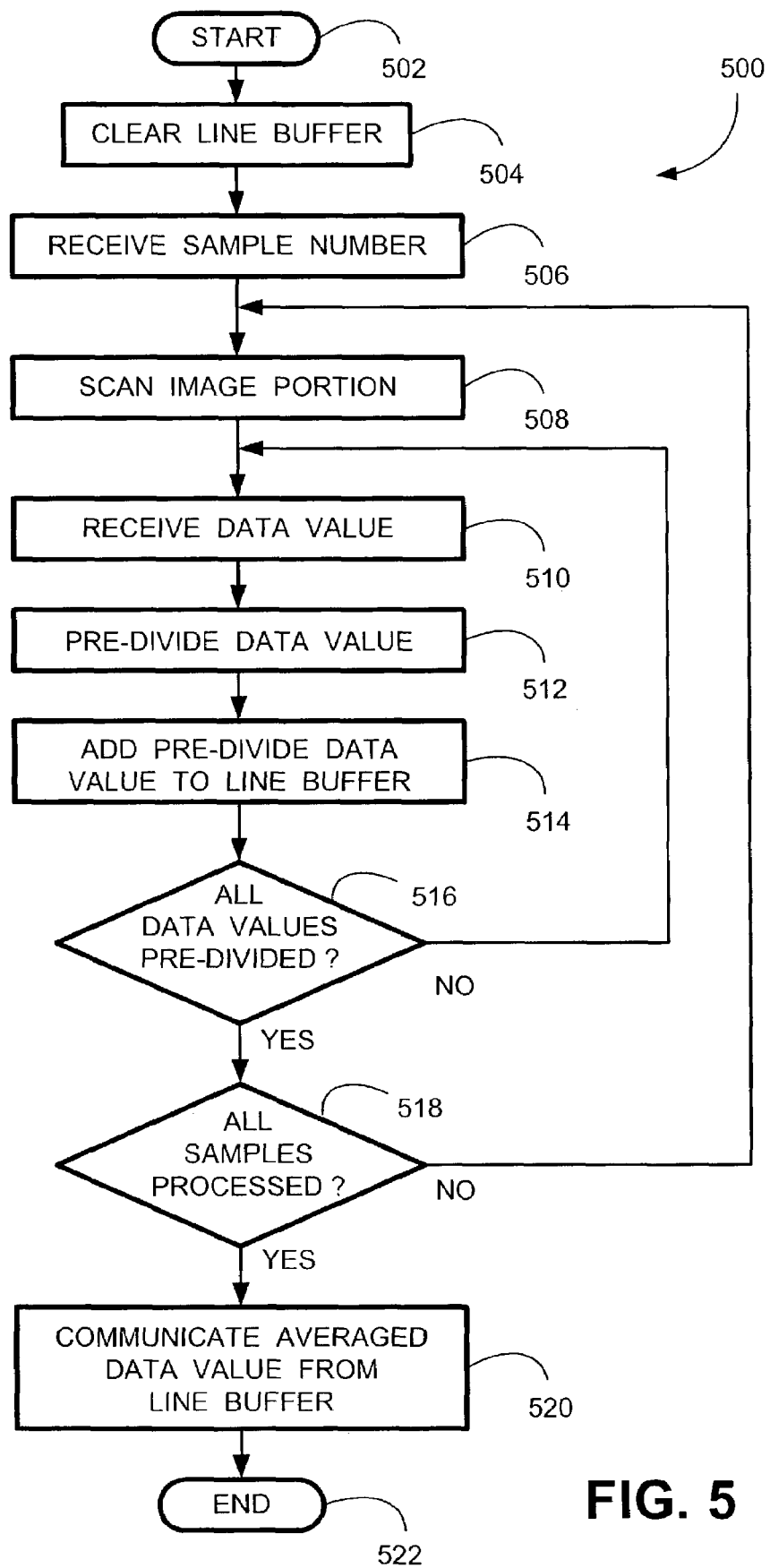
FIG. 5 is a flow chart illustrating an embodiment of a process, according to the present invention, for compensating random and/or shot noise.

FIG. 5 is a flow chart illustrating an embodiment of a process, according to the present invention, for compensating random and/or shot noise. The flow chart 500 shows the architecture, functionality, and operation of a possible embodiment of software for implementing the pre-divide logic 424 (FIG. 4) such that the plurality of received data values are pre-divided by the sample size and saved into line buffer 408. In this regard, each block may represent a module, segment or portion of code, which comprises one or more executable instructions for implementing the specified logical function(s). The specified logic functions could also be executed using a hardware state machine. It should also be noted that in some alternative implementations, the functions noted in the blocks may occur out of the order noted in FIG. 5, or may include additional functions, without departing from the functionality of the image capture device 400. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention.

The process begins at block 502. At block 504, image capture device 400 according to the present invention, clears the data, or sets that data to zero, or otherwise empties the contents of line buffer 408. In one embodiment, line buffer 408 is cleared when the average data values from a previous sampling process are communicated out from the line buffer 408 to other components residing in the image capture device 400. Registers in the line buffer 408 may be set to zero in one embodiment. In another embodiment, the ASIC treats the first data values by pre-dividing and storing the first data values into the line buffer (no addition operation occurs for the first data values).

At block 506 a sample number is received. The sample number, or sample size, defines the number of times that the image will be exposed to light and the light information will be read from CCD 402 according to the present invention. Also, the sample number defines the number of least significant bits that will be truncated during the pre-divide process or the number of bit positions that the binary number corresponding to the data value will be shifted, as described above. For example, the above-described embodiment was described as exposing the image and collecting light information four times. Thus, the sample size is four. A sample size of four corresponds to, a pre-divide by four, which corresponds to "100" (binary) and therefore truncating the least two significant bits (bit 1 and bit 2) of a binary number. Alternatively, a sample size of four equates to shifting the information in the binary number by two positions.

A block 508 the image portion is scanned by the CCD 402. That is, the image currently detected by the pixels 416a-416i is exposed to light. At block 510, data values corresponding to the image information from the pixels is received by the control ASIC 406 on a pixel-by-pixel basis. That is, the light information from each of the pixels 416a-416i residing in the CCD 402 is processed into a data values by the signal process unit 404 and communicated to the control ASIC 406.

At block 512 the received image information, referred to as a data value for each pixel 416a-416i, is pre-divided by the sample size on a pixel-by-pixel basis in accordance with the present invention as described above. At block 514, the resultant pre-divide data value for each pixel 416a-416i is added into the contents of the line buffer 408.

At block 516, a determination is made whether data values for all pixels 416a-416i have been pre-divided in accordance with the above-described process that pre-divides data values on a pixel-by-pixel basis. If data values for all pixels have been pre-divided (the YES condition), the process proceeds to block 518. If not (the NO condition) the process returns to block 510 such that the remaining data values are received, pre-divided and added to line buffer 408 on a pixel-by-pixel basis.

At block 518, a determination is made whether all samples have been processed. If additional samples are to be processed (the NO condition), the process returns to block 508 such that the image is scanned to obtain the next sample of data values. However, if at block 518 no additional samples are to be processed (the YES condition), the process proceeds to block 520. Thus, the scanning process of blocks 508 through 518 repeats until the image is scanned a number of times that equals the sample size.

At block 520, the average data values residing in the line buffer 408 are communicated to other components residing in the image capture device 400. Then, the process proceeds to block 522 and ends.

If an image is scanned by portions, the process illustrated by the flow chart 500 is repeated for the next image portion. Subsequent image portions are captured in accordance with the present invention until the entire image is captured.

Figure 6:
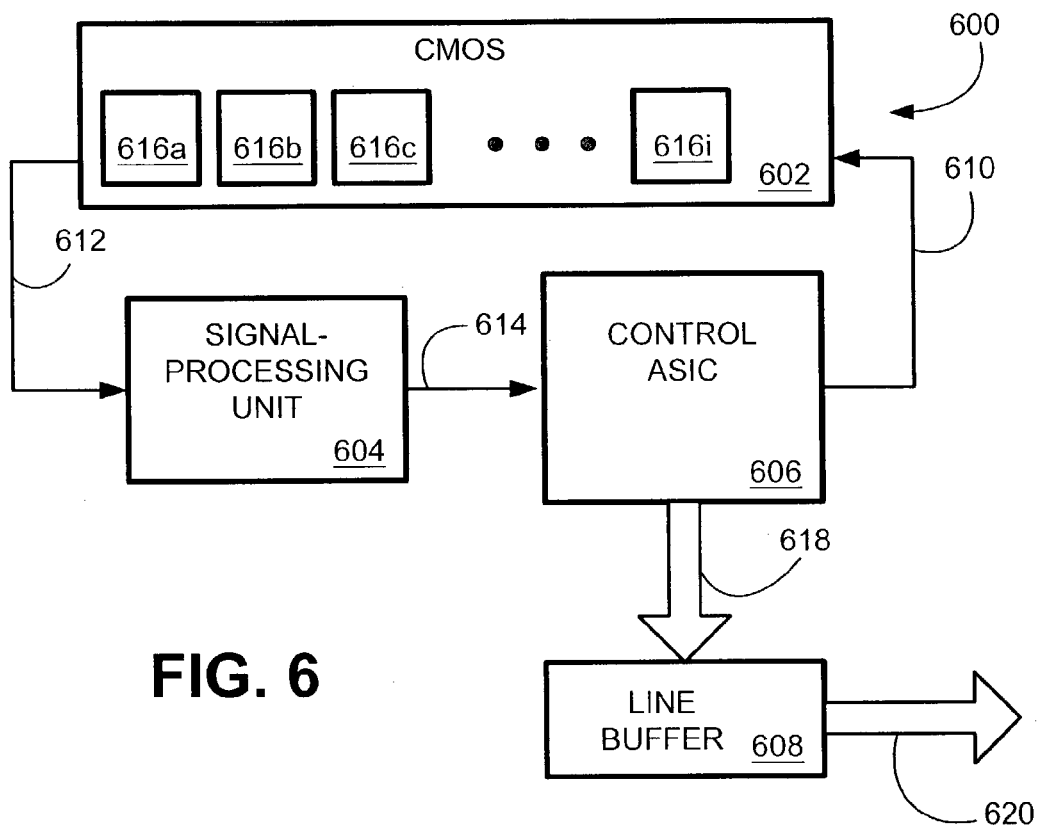
FIG. 6 is a block diagram illustrating another embodiment of an image capture device employing a complimentary metal-oxide semiconductor (CMOS) device.

FIG. 6 is a block diagram illustrating an alternative embodiment of an image capture device according to the present invention employing a complimentary metal-oxide semiconductor (CMOS). Image capture device 600 comprises at least a CMOS 602, a signal-processing unit 604, control ASIC 606, line buffer 608.

CMOS 602 comprises a plurality of pixels 616a-616i. CMOS 602 comprises other components, not shown for convenience, that are configured such that CMOS 602 communicates light information corresponding to light sensed by the pixels 616a-616i onto connection 612. The image capture device 600 employing CMOS 602, according to the present invention, is configured with components that are similar, or the same, as the components described above for the image capture device 100 (FIG. 1). For convenience, similar or like components in FIGS. 1 and 6 bear similar reference numerals (1xx in FIG. 1 and 6xx in FIG. 6), and accordingly, are not described again in detail.

The image capture device 600 employing CMOS 602 compensates light information from the pixels 616a-616i for random and/or shot noise in accordance with any of the above-described embodiments of the present invention employing pixels in a CCD. For example, if the sample size is defined as four, the CMOS 602 is exposed to the image for four times.

Similar to the above-described process for the image capture device 100, four data values for pixel 616a are determined and communicated to the control ASIC 606 during the four scans. Control ASIC 606 receives these four data values corresponding to pixel 616a, and in accordance with the present invention, pre-divides the four data values by a factor of four. These pre-divided four data values are each then communicated from the control ASIC 606 to the line buffer 608. Line buffer 608, as each pre-divided data value is received, accumulates the four pre-divided data values corresponding to pixel 616a to generate an average data value (the sum of the first, second, third and fourth pre-divided data values). That is, four pre-divided data values corresponding to light information from pixel 616a have been accumulated in line buffer 608.

Light information for all of the remaining pixels 616b-616i is processed by pre-dividing as described above for pixel 616a, in accordance with the present invention. That is, light information is received from the pixels in the CMOS 602, converted into a plurality of data values, each data value is pre-divided by four, and then communicated to line buffer 608. Accordingly, the pre-divided first, second, third and fourth data values for all of the pixels 616a-616i have been uniquely accumulated into the line buffer 608.

The above-described embodiment of the present invention is described herein as having a sample size of four. Any suitable sample size, in accordance with the present invention, may be specified in other embodiments.

Pixels 616a-616i in are configured into a single CMOS 602 for scanning. Alternatively, the pixels 616a-616i in another embodiment are configured into a plurality of CMOS arrays for color and/or black-and-white scanning. In yet another embodiment, the pixels 616a-616i are configured into a matrix CMOS for use in a digital camera or the like for capturing an image.

Figure 7:
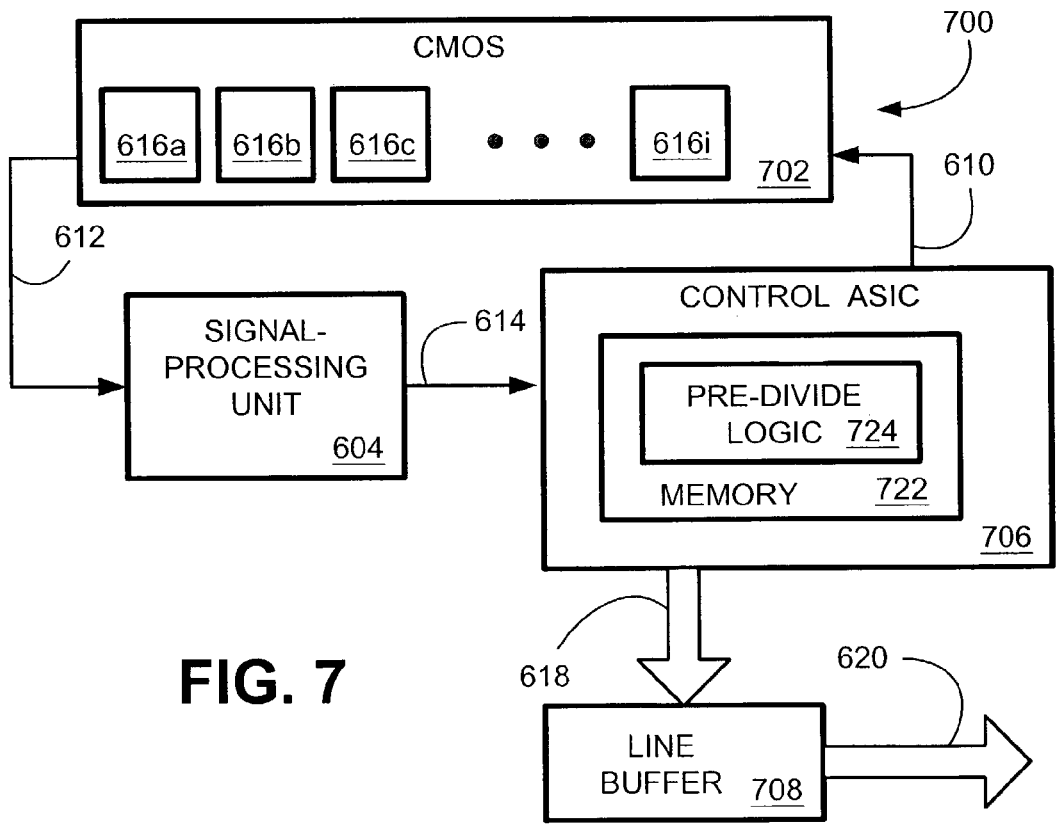
FIG. 7 is a block diagram illustrating another embodiment of an image capture device according to the present invention.

FIG. 7 is a block diagram illustrating another embodiment of an image capture device according to the present invention. Image capture device 700 comprises at least a CMOS 702, a signal-processing unit 604, control ASIC 706, and line buffer 708. CMOS 702 comprises at least a plurality of pixels 616a-616i. The image capture device 700 employing CMOS 702, according to the present invention, is configured with components that are similar, or the same, as the components described above for the image capture device 600 (FIG. 6). For convenience, similar or like components in FIGS. 6 and 7 bear the same reference numerals and are not described again in detail.

According to one embodiment of the present invention, image capture device 700 employing CMOS 702 compensates light information from the pixels 602a-602i for random and/or shot noise in accordance with any of the above-described embodiments employing pixels in a CCD. For example, if the sample size is defined as four, the CMOS 702 is exposed to the image for four times.

Similar to the above-described process for the image capture device 400, line buffer 708 is implemented as a memory, or a portion of a suitable memory. The current data value is retrieved by the control ASIC 706 from the line buffer 708, and the incoming pre-divided data value is added to the current data value to determine a new current data value. This new current data value is stored back into the line buffer 708. The process repeats until all sampling has been completed. Once sampling has been completed, data is communicated from line buffer 708, via connection 620, out to other components of the image capture device 700 for additional processing.

Accordingly, control ASIC 706 comprises at least a memory 722. Memory 722 comprises at least the pre-divide logic 724. As incoming data values are received from signal-processing unit 604, control ASIC 706 (or another suitable processor) executes the pre-divide logic 724 to pre-divide incoming data values. According to the present invention, a plurality of pre-divided data values are determined for each of the four samples such that the current data value is stored in line buffer 708, as described above. Accordingly, this embodiment is implemented in the line buffer 708, a memory, utilizing a plurality of sixteen-bit data values. Memory size is minimized since capacity does not need to be allocated for the storage of binary numbers greater that sixteen-bits (as would be required if overflow conditions were encountered). Furthermore, the flow chart 500 (FIG. 5) shows the architecture, functionality, and operation of an embodiment of software for implementing the pre-divide logic 724 such that the received data values are divided by the sample size and saved into line buffer 708.

FIG. 8 is a block diagram illustrating another embodiment of an image capture device according to the present invention employing a plurality of rows of pixels having color-sensitive pixels. Color-sensitive pixels 808 may be, for example, sensitive to green, red and blue light. In one embodiment, the plurality of pixels in a row are all sensitive to the same color. In another embodiment, rows of pixels 802, 804 and/or 806 may be comprised of a plurality of color-sensitive pixels 808 sensitive to different colors of light.

For convenience, three rows of pixels 802, 804 and 806 are illustrated in FIG. 8. Another embodiment employs two pixels rows. Other embodiments employ more than three pixel rows, thereby forming a matrix of pixels. Further more, the rows of pixels 802, 804 and 806 may be fabricated into CCD or CMOS devices.

When the image capture device 800 employing a plurality of rows of pixels 802, 804 and 806 is implemented as a CCD, according to the present invention, image capture device 800 employs components that are similar, or the same, as the above-described components for the image capture device 100 (FIG. 1) and/or the image capture device 400 (FIG. 4). Thus, in one embodiment, each of the rows of pixels 802, 804 and 806 is a CCD. For convenience, similar or like components in FIGS. 1 and 8 bear the same reference numerals and are not described again in detail. Furthermore, when implemented as a CMOS device, these components may operate as described above for the image capture devices 600 (FIG. 6) and/or the image capture device 700 (FIG. 7). In another embodiment, each of the rows of pixels 802, 804 and 806 is a CMOS device.

The above-described line buffers 108, 408, 608 and/or 708 are configured to store digital information corresponding to the data values. Line buffers 108, 408, 608 and/or 708 may be any suitable computer-readable medium for use by or in connection with any state machine, control ASIC, computer and/or processor related system or method. In the context of this document, line buffers 108, 408, 608 and/or 708 are computer-readable medium that is an electronic, magnetic, optical, or another physical device or means that contains or stores data. Furthermore, line buffers 108, 408, 608 and/or 708 can be embodied in any suitable computer-readable medium for use by or in connection with an instruction execution system, apparatus, or device, such as a computer-based system, processor-containing system, or other system that can fetch the instructions from the instruction execution system, apparatus, or device and execute the instructions associated with the determined data values. In the context of this specification, a "computer-readable medium" can be any means that can store, communicate, propagate, or transport the data associated with, used by or in connection with the instruction execution system, apparatus, and/or device. The computer-readable medium can be, for example, an electronic, magnetic, optical, electromagnetic, infrared, or semiconductor system, apparatus, device, or propagation medium now known or later developed.

Furthermore, for convenience of illustration and for convenience of describing the present invention, the line buffers 108, 408, 608 and/or 708 were each described as a stand-alone, dedicated memory element. The line buffers 108, 408, 608 and/or 708 may reside in any alternative convenient location within the image capture devices 100, 400, 600 and/or 700, respectively, or as components of other systems accessible by the image capture devices 100, 400, 600 and/or 700. For example, a multi-purpose memory element may reside in the image capture devices 100, 400, 600 and/or 700. A suitably sized and configured portion of the multi-purpose memory element may be allocated for storing the pre-divide data values and the average data values as determined in accordance with the present invention. Alternatively, line buffers 108, 408, 608 and/or 708 may reside within control ASIC 106, 406, 606 and 706, respectively, as a separate memory unit or as part of a multi-purpose memory unit.

When the described embodiment executes pre-divide logic 424 and/or 724 (FIGS. 4 and 7) configured to pre-divide data values by the sample size in accordance with the present invention, such pre-divide logic 424 and/or 724 resides in memory 422 and/or memory 722, respectively. Memories 422 and/or 722 can be implemented as any one of the above-described embodiments for computer-readable medium used for the line buffers 108, 408, 608 and/or 708.

For convenience, memory 422 was described as residing in control ASIC 406 as an internal component. Similarly, memory 722 was described as residing in control ASIC 706 as an internal component. Memories 422 and/or 722 may reside in any alternative convenient location within the image capture device 400 and/or 700, respectively, as a stand-alone, dedicated memory element, or as components of other systems accessible by the image capture devices 400 and/or 700. For example, but not limited to, a multi-purpose memory element may reside in the image capture devices 400 and/or 700. A suitably sized and configured portion of the multi-purpose memory element is allocated for storing the pre-divide logic 424 and/or 724 in one embodiment.

In another embodiment, the signal-processing unit 104 (FIG. 1) provides light information to control ASIC 106 that has not yet been converted into a binary number. Control ASIC 106 determines the binary number for the provided light information. Once binary information (data values) for all pixels have been determined by the control ASIC 106, light information is processed in accordance with the present invention as described herein. Furthermore, such an embodiment is equally applicable when light information is provided from pixels residing in a CMOS.

The present invention could be implemented in any arbitrary numbering system. If a device used a base three numbering system, the samples could be pre-divided by a number equivalent to powers of 3 (3,9,27 . . . ) and the appropriate number of samples could be summed to properly implement the invention. In addition, if divide operations are low overhead (similar to shift operations), the number of samples and the pre-divide divisor are not limited to a power of the number system base but can be any arbitrary value.

What is claimed:

1. A system for compensating for noise in a captured image, comprising:
   a plurality of pixels configured to capture an image a predefined number of times;
   a processing unit configured to receive a plurality of data values, wherein each of the data values uniquely corresponds to one of the plurality of pixels, and wherein the processing unit is further configured to generate a plurality of pre-divided data values by pre-dividing each of the plurality of data values by a number corresponding to the number of times that the image portion is to be captured; and
   a memory configured to receive the plurality of pre-divided data values such that for each of the plurality of pixels, the corresponding ones of the plurality of pre-divided data values are accumulated together to determine an average data value for each of the plurality of pixels so that noise is compensated by an averaging of the associated data values from each of the pixels.

2. The system of claim 1, wherein the plurality of pixels further comprises a linear array of pixels configured to scan a line of the image the predefined number of times.

3. The system of claim 1, further comprising a signal-processing unit communicatively coupled between the plurality of pixels and the processing unit, and configured to receive light information from the plurality of pixels and further configured to convert the received light information into the plurality of data values.

4. The system of claim 1, wherein the memory further comprises a plurality of accumulation registers such that when each of the plurality of pre-divided data values are received, each pre-divided data value is accumulated into a corresponding accumulation register such that corresponding ones of the plurality of pre-divided data values are added together to determine the average data value for each of the plurality of pixels.

5. The system of claim 4, wherein each of the plurality of accumulation registers further comprises sixteen serially-coupled single-bit accumulation registers.

6. The system of claim 1, wherein the memory further comprises a plurality of accumulation registers configured to accumulate corresponding pre-divided data values such that when the pre-divided data values are accumulated into the accumulation register, the average data value is determined without an overflow condition.

7. The system of claim 1, wherein the processing unit is further, configured to pre-divide each of the data values by shifting each of a plurality of bits of the data value by a predefined number of positions.

8. The system of claim 1, wherein the processing unit is further configured to pre-divide each of the data values by shifting each of a plurality of bits of the data value by a number of positions corresponding to the predefined number of times that the image is to be captured.

9. The system of claim 1, wherein the processing unit is further configured to pre-divide each of the data values by truncating at least one least significant bit (LSB) of a plurality of bits of the data value.

10. The system of claim 1, wherein the processing unit is further configured to pre-divide each of the data values by truncating at least one least significant bit (LSB) of a plurality of bits of the data value, the number of truncated LSBs corresponding to the predefined number of times that the image is to be captured.

11. The system of claim 1, wherein the memory further comprises a line buffer.

12. The system of claim 1, wherein the memory further comprises a line buffer having a plurality of registers, each of the registers configured to store a sum of the pre-divided data values associated with one of the plurality of pixels as each of the pre-divided data values is received.

13. The system of claim 1, further comprising a charged-coupled device (CCD) such that the plurality of pixels reside in the CCD.

14. The system of claim 13, further comprising a plurality of CCDs, each one of the CCDs having a plurality of color-sensitive pixels sensitive to a unique color of light.

15. The system of claim 1, further comprising at least one complimentary metal-oxide semiconductor (CMOS) device such that the plurality of pixels reside in the at least one CMOS device.

16. The system of claim 15, each of the at least one CMOS devices having a plurality of color-sensitive pixels sensitive to a unique color of light.

17. A method for compensating for noise in a captured image, the method comprising:
   scanning an image a predefined number of times with a plurality of pixels;
   receiving light information from each of the plurality of pixels each time the image is scanned;
   converting the received light information into a plurality of data values, each of the data values corresponding uniquely to light information from one of the plurality of pixels;
   generating a plurality of pre-divided data values by dividing each of the data values by a number corresponding to the number of times that the image is scanned; and
   adding corresponding ones of the pre-divided data values together such that an average data value is determined uniquely for each of the plurality of pixels so that noise is compensated by the averaging of the data values.

18. The method of claim 17, wherein the scanning further comprises scanning an image portion the predefined number of times before a second image portion is scanned.

19. The method of claim 17, wherein the scanning further comprises capturing the image the predefined number of times.

20. The method of claim 17, wherein the adding further comprises accumulating the corresponding pre-divided digital values into a line buffer.

21. The method of claim 17, wherein the adding further comprises accumulating the corresponding pre-divided digital values into a buffer comprised of a plurality of registers, each of the registers configured to accumulate the corresponding pre-divided digital values.

22. The method of claim 21, further comprising limiting size of each of the registers to a capacity corresponding to a largest one of the plurality of digital values.

23. The method of claim 17, wherein the adding further comprises accumulating each of the pre-divided data values into a line buffer register, each of the line buffer registers uniquely corresponding to one of the plurality of pixels, such that a newly-received pre-divided data value is added to an accumulated data value, the accumulated data value corresponding to a sum of previously-received pre-divided data values.

24. The method of claim 17, wherein the generating further comprises shifting each of a plurality of bits, the plurality of bits corresponding to one of the plurality of data values.

25. The method of claim 17, wherein the generating further comprises shifting each of a plurality of binary number bits by a number of positions corresponding to the number of times that the image is scanned.

26. The method of claim 17, wherein the generating further comprises truncating at least one least significant bit (LSB) of a plurality of bits corresponding to one of the data values.

27. The method of claim 17, wherein the generating further comprises truncating at least one least significant bit (LSB) of a plurality of bits corresponding to one of the data values, the number of truncated LSBs corresponding to the number of times that the image is scanned.

28. The method of claim 17, wherein the scanning further comprises communicating light from the plurality of pixels residing in at least one charged-coupled device (CCD).

29. The method of claim 28, wherein the communicating light further comprises communicating colored light from a plurality of color-sensitive pixels sensitive to a unique color of light.

30. The method of claim 17, wherein the scanning further comprises communicating light from the plurality of pixels residing in at least one complimentary metal-oxide semiconductor (CMOS) device.

31. The method of claim 30, wherein the communicating light further comprises communicating colored light from a plurality of color-sensitive pixels sensitive to a unique color of light.

32. The method of claim 17, further comprising specifying a sample size, the sample size corresponding to the number of times that the image is scanned.

33. A method for compensating for noise in a captured image, comprising:
   scanning an image a predefined number of times with a plurality of pixels;
   receiving a plurality of data values, each of the data values corresponding uniquely to light information from one of the plurality of pixels;
   generating a plurality of pre-divided data values by dividing each of the data values by a number corresponding to the number of times that the image is scanned; and
   communicating the pre-divided data values to a memory so that the corresponding ones of the plurality of pre-divided data values are accumulated together to determine an average data value for each of the plurality of pixels so that noise is compensated by an averaging of the associated data values from each of the pixels.

34. The method of claim 33 further comprising, scanning the image the predefined number of times before a second image is scanned.

35. A system for compensating for noise in a captured image, comprising:
   means for scanning a portion of an image a predefined number of times with a plurality of pixels such that light information is communicated from each of the plurality of pixels each time the image portion is scanned;
   means for converting the received light information into a plurality of data values, each of the data values corresponding uniquely to light information from one of the plurality of pixels;
   means for generating a plurality of pre-divided data values by dividing each of the data values by a number corresponding to the number of times that the image portion is scanned; and
   means for adding corresponding ones of the pre-divided data values together such that an average data value is determined uniquely for each of the plurality of pixels so that noise is compensated by the averaging of the data values.

36. The system of claim 35, wherein the means for generating further comprises means for pre-dividing each of the data values by shifting each of a plurality of bits of the data value by a number of positions corresponding to the predefined number of times that the image portion is to be scanned.

37. The system of claim 35, wherein the means for generating further comprises means for pre-dividing each of the data values by truncating at least one least significant bit (LSB) of a plurality of bits of the data value.

38. The system of claim 35, wherein the means for generating further comprises means for pre-dividing each of the data values by truncating at least one least significant bit (LSB) of a plurality of bits of the data value, the number of truncated LSBs corresponding to the predefined number of times that the image portion is to be scanned.

* * * * *

UNITED STATES PATENT AND TRADEMARK OFFICE
CERTIFICATE OF CORRECTION

PATENT NO.       : 7,495,806 B2                                              Page 1 of 1
APPLICATION NO.  : 10/395999
DATED            : February 24, 2009
INVENTOR(S)      : Kurt E. Spears It is certified that error appears in the above-identified patent and that said Letters Patent is hereby corrected as shown below:

In column 14, line 48, in Claim 7, delete "further," and insert -- further --, therefor.

In column 15, line 64, in Claim 25, delete "17," and insert -- claim 17, --, therefor.

Signed and Sealed this

Twenty-sixth Day of May, 2009

JOHN DOLL
*Acting Director of the United States Patent and Trademark Office*